(No Model.)
W. S. AUDSLEY.
MEANS FOR CONTROLLING SUPPLY OF WATER TO TANKS, CISTERNS, &c.
No. 576,421. Patented Feb. 2, 1897.
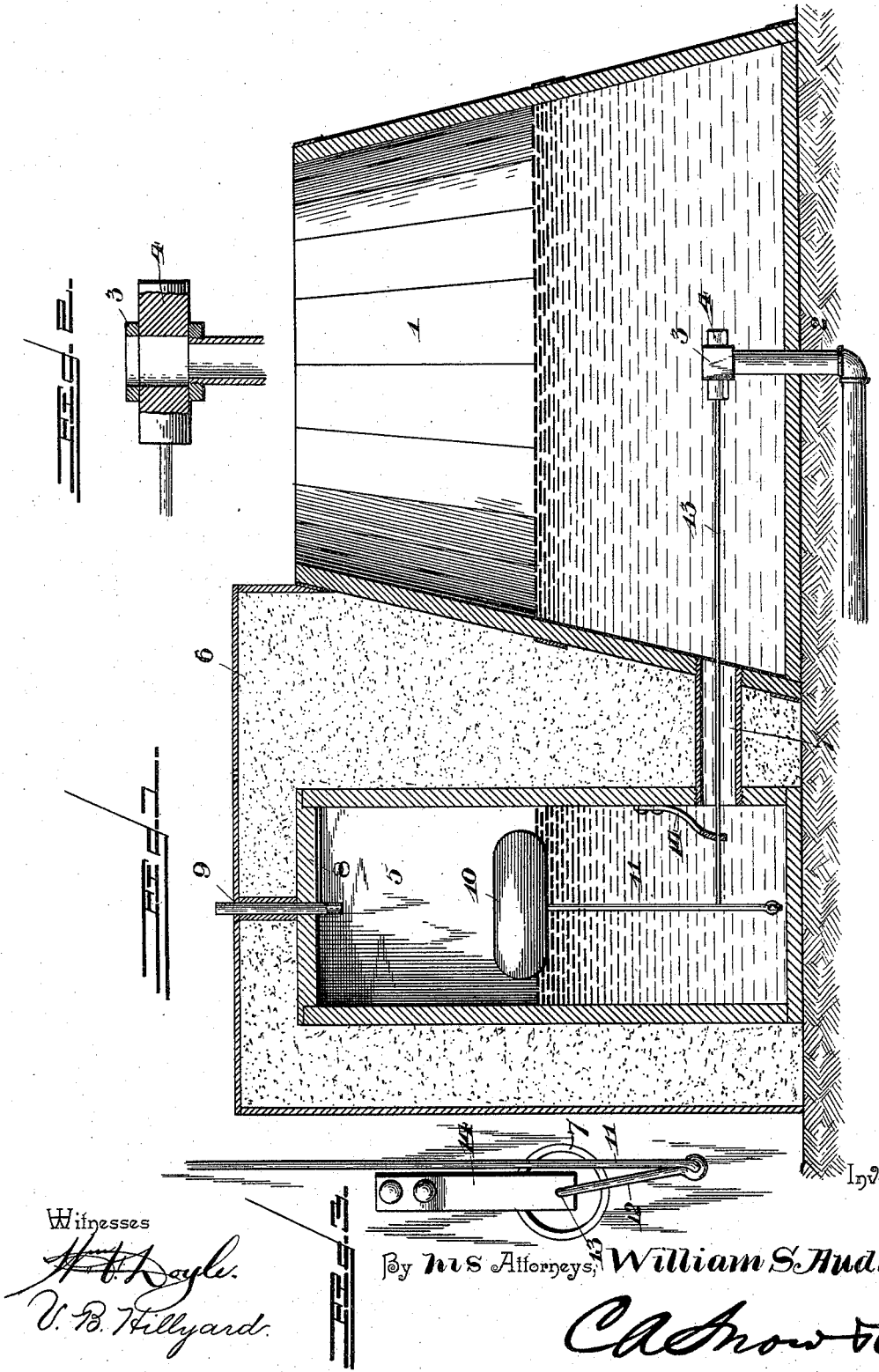
Witnesses
Inventor,
William S. Audsley,
By his Attorneys,
C. A. Snow & Co.

UNITED STATES PATENT OFFICE.

WILLIAM SHERMAN AUDSLEY, OF DE WITT, MISSOURI.

MEANS FOR CONTROLLING SUPPLY OF WATER TO TANKS, CISTERNS, &c.

SPECIFICATION forming part of Letters Patent No. 576,421, dated February 2, 1897.

Application filed May 19, 1896. Serial No. 592,189. (No model.)

*To all whom it may concern:*

Be it known that I, WILLIAM SHERMAN AUDSLEY, a citizen of the United States, residing at De Witt, in the county of Carroll and State of Missouri, have invented a new and useful Means for Controlling the Supply of Water to Tanks, Cisterns, &c., of which the following is a specification.

This invention is designed to provide means for regulating the supply of water to tanks, cisterns, or reservoirs for watering stock, for domestic use, or for other purposes where the supply is to be controlled for any reason.

The invention is especially designed to be used in connection with wind-engines to throw them out of gear when the tank or cistern is properly replenished, and can be relied upon in cold weather, as the device is constructed with especial reference to prevent its freezing.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a vertical section showing the invention applied. Fig. 2 is a detail view of the valve for controlling the admission or supply of water to the tank or cistern. Fig. 3 is a detail view showing the connection between the float and valve stem.

Corresponding and like parts are referred to in the following description and indicated in the several views of the drawings by the same reference-characters.

The numeral 1 represents a tank, cistern, reservoir, or other receptacle usually resorted to for storing a quantity of water to be drawn upon when required, and this tank or cistern may be of any size or shape and located at any convenient point. The pipe 2 for supplying water to the tank enters the latter at any convenient place, and, as shown, passes through the bottom of the tank and terminates in a casing 3, in which operates a plug-valve 4. This pipe 2 communicates with a fount, pump, or other means for supplying water.

A reservoir or box 5 is conveniently located, preferably adjacent to the tank 1, and is surrounded by a bed or layer 6, of sawdust, manure, or like material, to prevent the freezing of the water in the reservoir during extremely cold weather. The reservoir and tank are in communication by means of a pipe or tube 7, so that the level of the water in each will be the same. The upper end of the reservoir or box 5 is closed by a cover 8, through which extends a tube 9 for the passage of the wire, chain, or other connection for throwing the wind-engine out of gear when the level of the water in the reservoir and tank reaches a predetermined position. A float 10 is located in the reservoir 5 and has a rod or stem 11, which is connected with a radius-arm 12 of the rod or stem 13 of the plug-valve 4, said rod or stem 13 passing through the pipe 7 and obtaining a bearing in a bracket 14, attached to the reservoir or water-box 5. It will be understood that where the reservoir and tank are remotely situated the pipe 7 will be of corresponding length to the distance between them, and the rod or stem 13 will be arranged substantially as shown, so as to connect the plug-valve with the float-stem.

The valve 4 is rotatable in its casing 3, and the connections between it and the float are such as to cause an opening and closing of the valve according to the position of the float. When the water in the tank falls below a certain level, the float will descend and open the valve 4, thereby permitting the tank to be replenished, and when the level of the water in the tank reaches the required height or elevation the float will ascend and operate the valve so as to cut off the supply, and thereby prevent the flooding or overflowing of the tank and reservoir. Obviously by connecting the float 10 with the wind-engine or shipper mechanism thereof the said engine can be thrown into or out of gear in the usual way, as will be readily comprehended.

Having thus described the invention, what is claimed as new is—

In combination, a tank for receiving a supply of water, a reservoir located at a distance from and in communication with the tank by means of a pipe and embedded in sawdust, manure, or like matter so as to prevent the freezing of the water contained therein, a pipe for supplying water to the tank, terminating at its discharge end in a valve-casing, a plug-valve rotatably fitted in the casing, a rod or stem having connection at one end with the plug-valve passing through the connecting-pipe and terminating at its opposite end in a radius-arm which is located in the said reservoir, and a float arranged within the reservoir and having its stem connected with the said radius-arm, substantially in the manner set forth for the purpose described.

In testimony that I claim the foregoing as my own I have hereto affixed my signature in the presence of two witnesses.

WILLIAM SHERMAN AUDSLEY.

Witnesses:
J. EDGAR JONES,
W. E. MILLER.